US009067223B2

(12) United States Patent
Fulkerson et al.

(10) Patent No.: US 9,067,223 B2
(45) **Date of Patent: *Jun. 30, 2015**

(54) COLOR CHANGE FOR POWDER COATING MATERIAL APPLICATION SYSTEM

(75) Inventors: Terrence M. Fulkerson, Brunswick, OH (US); Terry John Thompson, Wakeman, OH (US); Jeffery Edward Dailidas, Barrington, IL (US); Kenneth A. Kreeger, Grafton, OH (US); Joseph G. Schroeder, North Royalton, OH (US)

(73) Assignee: Nordson Corporation, Westlake, OH (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/352,412

(22) Filed: Jan. 18, 2012

(65) Prior Publication Data

US 2012/0114864 A1 May 10, 2012

Related U.S. Application Data

(63) Continuation of application No. 12/732,695, filed on Mar. 26, 2010, now Pat. No. 8,132,743, which is a continuation of application No. 11/144,878, filed on Jun. 3, 2005, now Pat. No. 7,712,681.

(60) Provisional application No. 60/577,223, filed on Jun. 3, 2004.

(51) Int. Cl.

*E03C 1/046* (2006.01)
*A01M 13/00* (2006.01)
(Continued)

(52) U.S. Cl.

CPC ............. *B05B 7/1404* (2013.01); *B05B 7/1459* (2013.01); *B05B 12/14* (2013.01); *B05B 12/149* (2013.01); *B05B 15/1229* (2013.01)

(58) Field of Classification Search

CPC ....... E03C 1/046; A01M 13/00; A61K 8/046; A61K 2800/88; A61K 2800/882; B05B 7/1459; B05B 7/1404; B05B 15/1229; B05B 12/149; B05B 12/14

USPC ............. 239/303, 104–123; 417/313, 65, 86, 417/390, 559

See application file for complete search history.

(56) References Cited

U.S. PATENT DOCUMENTS

| | | | |
|---|---|---|---|
| 2,806,781 | A | 9/1957 | Shepherd et al. |
| 2,895,768 | A | 7/1959 | Bray, Jr. |

(Continued)

FOREIGN PATENT DOCUMENTS

| | | |
|---|---|---|
| DE | 44 23 643 | 1/1996 |
| DE | 4423643 | 1/1996 |

(Continued)

OTHER PUBLICATIONS

Partial International Search Report from PCT/US2005/019740, mailed Oct. 10, 2005.

(Continued)

*Primary Examiner* — Melanie Tyson
*Assistant Examiner* — Chee-Chong Lee
(74) *Attorney, Agent, or Firm* — Calfee, Halter & Griswold LLP

(57) ABSTRACT

A color changer has a common feed passage that is connected to two or more inlet passages. The common feed passage can be reverse purged in a direction that is opposite a direction of powder flow through the common feed passage. A valve element seals a supply port that connects the inlet passage to the common feed passage to eliminate dead space and form a near bore line seal. The valve element is an elastic material that expands in response to applied compressed air inside the valve element.

13 Claims, 7 Drawing Sheets

(51) Int. Cl.

| | |
|---|---|
| ***B05B 7/14*** | (2006.01) |
| ***B05B 12/14*** | (2006.01) |
| *B05B 15/12* | (2006.01) |

(56) References Cited

U.S. PATENT DOCUMENTS

| | | | | |
|---|---|---|---|---|
| 3,135,467 | A | 6/1964 | Greenman | |
| 3,146,950 | A | 9/1964 | Lancaster | |
| 3,167,359 | A | 1/1965 | Aller | |
| 3,240,225 | A | 3/1966 | Barrows | |
| 3,260,285 | A | 7/1966 | Vogt | |
| 3,348,774 | A | 10/1967 | Wiggins | |
| 3,373,762 | A | 3/1968 | Korchak | |
| 3,667,674 | A | 6/1972 | Parsons et al. | |
| 3,672,570 | A * | 6/1972 | Scarbrough et al. | 239/70 |
| 3,674,207 | A | 7/1972 | Carbonetti, Jr. et al. | |
| 3,782,632 | A | 1/1974 | Braun et al. | |
| 3,873,024 | A | 3/1975 | Probst et al. | |
| 3,912,235 | A | 10/1975 | Janssen | |
| 3,924,810 | A | 12/1975 | Otterstetter | |
| 3,951,572 | A | 4/1976 | Ray, Jr. et al. | |
| 4,163,523 | A | 8/1979 | Vincent | |
| 4,230,270 | A | 10/1980 | Poret | |
| 4,248,379 | A | 2/1981 | Hollstein et al. | |
| 4,269,548 | A | 5/1981 | von Bennigsen-Mackiewicz et al. | |
| 4,302,481 | A | 11/1981 | Ribnitz et al. | |
| 4,337,282 | A * | 6/1982 | Springer | 427/421.1 |
| 4,345,858 | A | 8/1982 | Bartow | |
| 4,381,898 | A | 5/1983 | Rotolico et al. | |
| 4,391,860 | A | 7/1983 | Rotolico et al. | |
| 4,457,258 | A | 7/1984 | Cocks | |
| 4,576,526 | A | 3/1986 | Muller et al. | |
| 4,627,465 | A | 12/1986 | Kolibas et al. | |
| 4,640,310 | A | 2/1987 | Hartle et al. | |
| 4,657,047 | A | 4/1987 | Kolibas | |
| 4,697,962 | A | 10/1987 | Dunbar et al. | |
| 4,723,709 | A | 2/1988 | Curran, Jr. et al. | |
| 4,739,933 | A | 4/1988 | Hanano | |
| 4,787,783 | A | 11/1988 | Girardelli | |
| 4,826,362 | A | 5/1989 | Hayashi | |
| 4,850,703 | A | 7/1989 | Hanaoka et al. | |
| 4,944,459 | A | 7/1990 | Watanabe et al. | |
| 4,962,724 | A * | 10/1990 | Prus et al. | 118/688 |
| 5,037,247 | A | 8/1991 | Kaiser et al. | |
| 5,147,152 | A | 9/1992 | Link | |
| 5,215,261 | A | 6/1993 | Frene | |
| 5,273,406 | A | 12/1993 | Feygin | |
| 5,288,324 | A | 2/1994 | Shaneyfelt | |
| 5,549,755 | A | 8/1996 | Milovich et al. | |
| 5,622,457 | A | 4/1997 | Thiele | |
| 5,775,852 | A | 7/1998 | Boutte et al. | |
| 5,928,423 | A | 7/1999 | Toyota et al. | |
| 6,027,566 | A * | 2/2000 | Telchuk et al. | 118/326 |
| 6,105,880 | A | 8/2000 | Bazil et al. | |
| 6,112,999 | A | 9/2000 | Fingleton et al. | |
| 6,217,944 | B1 | 4/2001 | Yoshida et al. | |
| 6,223,997 | B1 | 5/2001 | Fulkerson et al. | |
| 6,315,214 | B1 | 11/2001 | Fingleton et al. | |
| 6,338,441 | B1 | 1/2002 | Umezawa et al. | |
| 6,375,093 | B1 | 4/2002 | Fulkerson et al. | |
| 6,419,425 | B1 | 7/2002 | Fourcroy et al. | |
| 6,508,610 | B2 | 1/2003 | Dietrich | |
| 6,537,244 | B2 | 3/2003 | Paukovits et al. | |
| 6,589,342 | B2 | 7/2003 | Attinoto et al. | |
| 6,619,563 | B2 | 9/2003 | Van der Steur | |
| 6,651,902 | B2 | 11/2003 | Ehinger et al. | |
| 6,682,001 | B2 | 1/2004 | Diana | |
| 6,695,220 | B2 | 2/2004 | Vollmer | |
| 6,699,325 | B2 | 3/2004 | Mauchle et al. | |
| 6,702,893 | B2 | 3/2004 | Thome et al. | |
| 6,705,545 | B1 | 3/2004 | Sroka et al. | |
| 6,783,084 | B1 | 8/2004 | Nelson | |
| 6,786,425 | B2 | 9/2004 | Rawlings | |
| 6,908,048 | B2 | 6/2005 | DiGioia et al. | |
| 6,935,366 | B2 | 8/2005 | Ciarelli et al. | |
| 6,945,483 | B2 | 9/2005 | Clifford et al. | |
| 6,977,013 | B2 * | 12/2005 | Schroeder et al. | 118/679 |
| 7,005,159 | B2 | 2/2006 | Ciarelli et al. | |
| 7,037,374 | B2 | 5/2006 | Binder | |
| 7,150,585 | B2 | 12/2006 | Kleineidam et al. | |
| 2002/0100817 | A1 | 8/2002 | Schroeder et al. | |
| 2002/0139301 | A1 | 10/2002 | Attinoto et al. | |
| 2003/0138556 | A1 | 7/2003 | Binder | |
| 2003/0192963 | A1 | 10/2003 | Ebberts | |
| 2004/0020353 | A1 | 2/2004 | Ravid et al. | |
| 2004/0060510 | A1 | 4/2004 | Ciarelli et al. | |
| 2005/0095071 | A1 | 5/2005 | Kleineidam et al. | |
| 2005/0115496 | A1 * | 6/2005 | Shutic et al. | 118/308 |
| 2005/0158187 | A1 | 7/2005 | Fulkerson et al. | |
| 2005/0279860 | A1 * | 12/2005 | Fulkerson et al. | 239/337 |
| 2006/0246212 | A1 | 11/2006 | Takahashi et al. | |

FOREIGN PATENT DOCUMENTS

| | | |
|---|---|---|
| DE | 19705381 | 8/1998 |
| DE | 10125648 | 11/2002 |
| EP | 1270087 | 1/2003 |
| EP | 1773507 | 8/2012 |
| GB | 1485255 | 9/1977 |
| JP | 53-25658 | 3/1978 |
| JP | 54-65737 | 5/1979 |
| JP | 54-96545 | 7/1979 |
| JP | 55022355 | 2/1980 |
| JP | 4358554 | 11/1992 |
| JP | 06-04778 | 2/1994 |
| JP | 8170740 | 12/1994 |
| JP | 7-313922 | 12/1995 |
| JP | 8-91565 | 4/1996 |
| JP | 09-71325 | 3/1997 |
| JP | 10-24255 | 1/1998 |
| JP | 2000-254558 | 9/2000 |
| JP | 2000-312846 | 11/2000 |
| JP | 2000-312848 | 11/2000 |
| WO | 2006-004601 | 1/2006 |

OTHER PUBLICATIONS

English translation of Office Action dated Jul. 4, 2011 for corresponding Japanese Patent Application No. 2007-515668.

* cited by examiner

COLOR CHANGE FOR POWDER COATING MATERIAL APPLICATION SYSTEM

CROSS REFERENCE TO RELATED APPLICATION

This application is a continuation of U.S. patent application Ser. No. 12/732,695, filed Mar. 26, 2010, for COLOR CHANGE FOR POWDER COATING MATERIAL APPLICATION SYSTEM, which is a continuation of U.S. patent application Ser. No. 11/144,878, filed Jun. 3, 2005, for COLOR CHANGE FOR POWDER COATING MATERIAL APPLICATION SYSTEM, which claims the benefit of U.S. Provisional patent application Ser. No. 60/577,223 filed on Jun. 3, 2004 for AUTOMATED POWDER COLOR CHANGE SYSTEM, the entire disclosures of which are fully incorporated herein by reference.

TECHNICAL FIELD OF THE INVENTION

The invention relates generally to material application systems, such as for example powder coating material application systems, and more particularly to apparatus and methods for improved material change operations such as for example quick color change.

BACKGROUND OF THE INVENTION

A typical powder coating material application system includes one or more sources or supplies of powder coating material, a pump arrangement and a spray applicator such as a spray gun. Usually the powder coating materials are sprayed within a spray booth that contains powder overspray and also has an overspray recovery system to collect powder overspray and either reclaim it for further use or disposal. Spray guns are typically either manual guns that are hand held during operation, or automatic guns that are mounted on a support and are triggered and controlled by an electronic control system. The spray guns may be electrostatic such as corona or tribo-charging, or non-electrostatic. A supply hose is commonly used to connect a powder source such as a hopper to a pump inlet, and a feed hose is commonly used to connect a pump outlet to a spray gun inlet or multiple gun inlets. These hoses are typically flexible plastic hoses.

Many powder coating material application systems are designed to apply a wide variety of powder coating materials to an even wider variety of objects. Different powder coating materials usually involve different colors, but may further include different types of material such as polymeric, such as for example epoxies, polyesters and hybrids of epoxies and polyesters, or metallic, for example polyester with aluminum flake. In order to change over from spraying one type or color powder coating material to another, the application system must be thoroughly cleaned of the previous material before the next material is sprayed, in order to prevent contaminating the new spraying operation. This involves not only cleaning exterior surfaces such as the spray booth and spray guns, but also the entire powder flow path from the supply to the pump and through the outlet of all of the spray guns that were used in the previous spraying operation. These color change or material change operations are time and labor intensive and therefore are a significant cost factor.

SUMMARY OF THE INVENTION

The invention contemplates in one aspect a powder coating material application system having a material changer function that is fast and efficient, such as for example for a color change operation. The changer function allows for material flow in one direction and a purge flow in an opposite direction. In one embodiment, a material changer is provided that has a common feed passage connected to a plurality of material supplies, with each supply having an associated inlet passage that opens to the common passage at a port that is sealed by a valve member. The valve member seals the port with a near bore line seal. In a particular embodiment the port is formed in the wall that defines the common feed passage. In a further embodiment the valve member is inflatable by air pressure and a portion of the valve member slightly protrudes into the common feed passage, in effect creating a "zero cavity" or near bore line seal. The common feed passage can be reverse purged with all of the inlet valves closed to an outlet that may be connected to a waste receptacle or other powder collector such as the spray booth. An optional forward purge function may also be used.

In accordance with another aspect of the invention, a powder coating system includes a material changer function as described above, a pump and an applicator. In a supply mode of operation for the changer function, the pump produces a negative pressure to suck powder from the changer and positive pressure to push powder to the applicator. In a purge mode of operation of the changer function, the pump produces a positive pressure back to the changer, and optionally positive pressure to the applicator. In one embodiment, the pump produces a soft purge function and a hard purge function, and the changer may be purged to a waste or dump outlet and also through the last inlet used during a coating operation.

The invention further contemplates a powder coating material supply having a changer function and a pump function wherein the pump function sucks material from a selected supply during a supply mode of operation and provides compressed air by reverse flow to the changer function during a purge mode of operation.

The invention in another aspect contemplates a material changer, such as can be used for example for color change, for a powder coating system. The changer in one embodiment includes control valves that form near bore line seals with a common feed passage, and a reverse purge flow feature. The reverse purge feature may be realized in the form of a reverse flow purge through the common feed passage to an outlet, and optionally through the previous used inlet. An optional purge feature in the forward direction may also be provided. In another embodiment the changer, or at least the material flow path within the changer, is made from low impact fusion material, for example, PTFE (TEFLON™) or high density polyethylene. In another embodiment each control valve includes a valve member such as a bladder that is made of elastic material, such as for example natural rubber, and expands under air pressure to seal a port that joins an inlet to a common feed passage. The invention further contemplates use of a changer function in accordance with the invention in combination with material application system that includes a pump, applicator such as a spray gun for example and may further include a spray booth. In one embodiment the pump may be a dense phase pump.

The invention in another aspect contemplates the various methods embodied in the use of such functions as the material changer and powder coating system as described above, as well as in another embodiment a method for reverse purging a material changer. In another method contemplated by the invention, control of powder flow through a changer is realized by the application of positive pressure to a valve function to cause a valve member to expand and close a port.

These and other aspects and advantages of the present invention will be apparent to those skilled in the art from the following description of the exemplary embodiments in view of the accompanying drawings.

DESCRIPTION OF THE EXEMPLARY EMBODIMENTS

Figure 1:
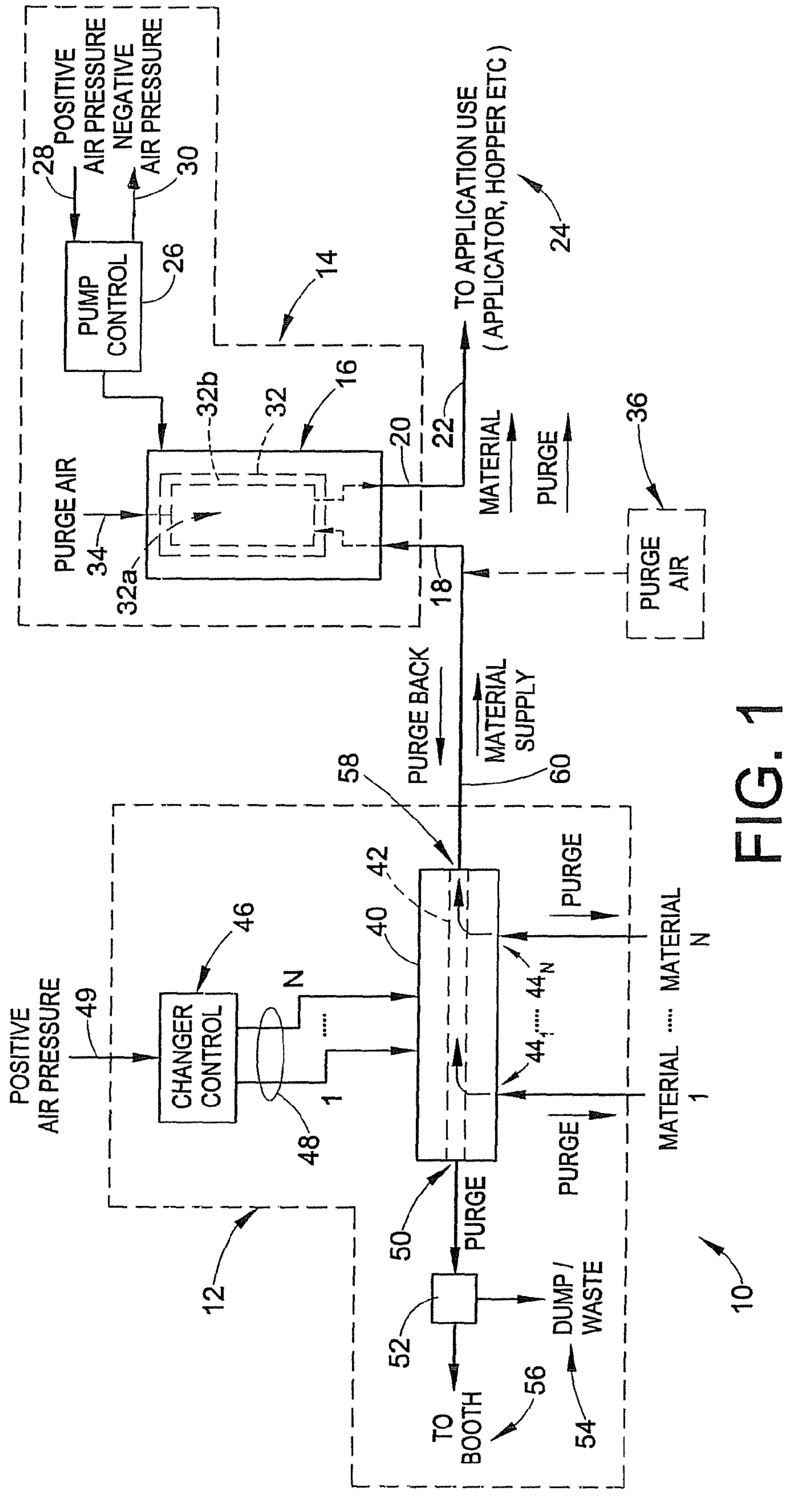
FIG. 1 is a schematic diagram of a supply for a powder coating material application system using a material changer and a pump.

The invention is described herein with particular reference to a material application system, such as for example may be used for the application of powder coating materials such as paint, lacquers and so on. While the described embodiments herein are presented in the context of a powder coating material application system, those skilled in the art will readily appreciate that the present invention may be used in many different dry particulate material application systems, including but not limited in any manner to: talc on tires, superabsorbents such as for diapers, food related material such as flour, sugar, salt and so on, desiccants, release agents, and pharmaceuticals. These examples are intended to illustrate the broad application of the invention for application of particulate material to objects. The specific design and operation of the material application system selected provides no limitation on the present invention except as otherwise expressly noted herein. Thus any use herein of the terms 'powder coating' or 'powder' is intended not as a term of art and not to be exclusive but rather inclusive to include any dry particulate material.

Furthermore, while the exemplary embodiments illustrate the invention being used as part of an application system wherein powder coating material is supplied to an applicator, various aspects of the invention may also be used to provide material to another container such as a hopper that itself has a powder delivery system associated with it to feed powder to an applicator arrangement.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

With reference to FIG. 1, a supply 10 for a material application system is illustrated, and includes a material changer function 12 and a pump function 14. The material changer function 12 may be used for changing between one supply of material and another supply of material up to N number of supplies. For example, the material changer may be used to change colors or types of material. FIG. 1 also illustrates schematically the relational flows for material and air during a supply mode of operation and during a purge mode of operation. By supply mode of operation is meant that material is being fed from a selected one of the N supplies to the pump and on to a user function, such as a spray gun for example or another receptacle such as a hopper. By purge mode of operation is meant that as part of a color change or other material change operation, cleaning operation or maintenance operation, the material flow path needs to be cleaned or purged of the previous material before a newly selected material can be used.

Immediately apparent from the flow arrows in FIG. 1 is an appreciation that material flows in a first direction and the purge air flows in a second direction that is opposite the first direction, as will be more fully described hereinafter. An optional second purge function is available to purge the changer in the same direction as the material flow direction.

The pump function 14 may be realized for example using a pump 16 having a powder inlet 18 and a powder outlet 20. The powder outlet 20 may be connected by an application hose such as for example a spray gun hose 22 to another application or use 24, such as for example a spray gun, hopper and so forth. The pump 16 may be, for example, a dense phase pump or other suitable pump design. Examples of pumps suitable for use with the present invention but not intended to be exclusive, are described in the following publications and applications: U.S. patent application Ser. No. 10/501,693 filed on Jul. 16, 2004 for PROCESS AND EQUIPMENT FOR THE CONVEYANCE OF POWDERED MATERIAL, published under publication no. US 2005/0095071 A1 on May 5, 2005; and pending U.S. patent application Ser. No. 10/711,429 filed on Sep. 17, 2005 for DENSE PHASE PUMP FOR DRY PARTICULATE MATERIAL; the entire disclosures both of which are fully incorporated herein by reference. The particular details of the pump design are well known and not needed to fully understand the present invention and therefore are not repeated herein. The pump 16 typically will have a pump control function 26 associated with it that controls the alternating application of positive and negative pressure air 28, 30 to a pump pressure chamber 32 to suck powder under negative pressure into the pump chamber 32*a* through the inlet 18 and push powder under positive pressure out of the pump chamber to the pump outlet 20. For example, a porous cylindrical tube 32*b* may be used to form the pump chamber 32*a* so that positive and negative pressure can be applied alternately to the pump chamber 32*a* from the pressure chamber 32. In a preferred but not required aspect of the invention, the pump 16 includes a purge function 34 that applies positive pressure air through the pump chamber, either at a lower flow, referred to herein as a soft purge, or at a higher pressure, referred to herein as a hard or system purge. The purge function 34 may use conveyance air from the pump control 26 also, for example, to soft purge through the porous pressure chamber walls. Conveyance air is the air that is used to pump powder out of the pump chamber under positive pressure through the porous pressure chamber walls. Regardless of the pump design selected, however, the pump 16 preferably provides purge air in some manner, or alternatively another source 36 (shown in phantom) provides a purge air function into the system wherein the purge air can flow towards the changer function 12, and optionally towards the application 24. In the exemplary embodiment, purge air from purge function 34, such as by control of an air valve, flows through the pump chamber 32*a* to the inlet 18 and outlet 20. Purge air can also flow through the porous tube 32*b* into the pump chamber 32*a* to help clean the porous tube.

The pump control function 26 may be realized, for example, in any number of ways, including the use of air valves to alternate the application of positive and negative pressure to the pump chamber 32, as well as air valves to control application of positive air pressure for the purging function. The control function 26 may further include the use of additional valves, such as pneumatic pinch valves for example (not shown), to control the flow of powder—and purge air—to and from the pump chamber 32 via the inlet 18 and outlet 20. Any number of a wide variety of control circuits may be used to control operation of the various pneumatic and powder flow valves.

The exemplary pump 16 described above and illustrated schematically in FIG. 1 and other drawings herein is fully described in pending U.S. patent application Ser. No. 10/711,429 filed on Sep. 17, 2005 for DENSE PHASE PUMP FOR DRY PARTICULATE MATERIAL incorporated by reference hereinabove, but the above description is sufficient to understand and practice the present invention with such a pump design or other pump design. The pump function 16 therefore preferably but not necessarily provides a positive purge air function back to the changer function 12, and also a suction function at the pump inlet 18 to draw powder into the pump from the changer function 12. Note from FIG. 1 that in the embodiment therein the purge flow direction for the changer function 12 is opposite the material flow direction, whereas the purge flow direction for the application 24 is in the same direction as the material flow direction.

The material changer function 12 includes a material changer device 40, functioning for example, as a color changer. The changer 40 may include several additional functions and components as required, which may be integral to the changer 40 or associated therewith, as will be described hereinafter. The changer 40 is preferably although not necessarily a manifold type body made of low impact fusion material such as, for example, ultra high molecular weight polyethylene, or other suitable material. Alternatively the changer body 40 may be made of any suitable strength material with the powder flow paths coated with a suitable low impact fusion material.

The changer 40 includes a common feed passage 42 therein. This feed passage 42 forms the main powder flow path through the changer and is a common flow passage meaning that any selected material from any one of N supplies flows through the common passage 42 to the pump function 14. The changer 40 thus further includes N inlets $44_1$-$44_N$. Each inlet 44 is respectively connectable to a supply of powder coating material (not shown in FIG. 1) such as N colors or other material characteristics. Inlet control valves (not shown in FIG. 1) are used to select which inlet and material will be used for a particular application. A changer control function 46 is used to control operation and selection of the N inlet control valves. In the exemplary embodiments herein, the inlet control valves are pneumatic valves and therefore the control function 46 may be realized in one of many ways to control application of air pressure 49 via N respective air hoses 48 to the inlet valves. In the exemplary embodiment herein, the inlet valves are closed by application of positive pressure and opened by releasing the positive pressure.

The material changer 40 further may include a purge outlet 50. The purge outlet 50 may be controlled by a control function 52 such as, for example, a dump valve. The dump valve may be used for example to control whether purged powder flows to a waste/dump container 54 or back to the spray booth 56, for example. More than one dump valve may be used as required. The purge outlet dump valve may be provided separate from the changer 40 or integrated therewith. By having the purge outlet dump valve as a separate component, the changer may be a symmetrical unit that can be daisy chained directly to another changer.

The material changer 40 operates in a purge mode or a supply mode. During the supply mode, one of the inlets 44 is opened (no air pressure is applied to the associated inlet valve) to allow material to flow through an inlet passage 180 (FIG. 5) through a port 192 (FIG. 5) into the common feed passage 42 to a changer outlet 58 (FIG. 1) which is connected to the pump inlet 18 (FIG. 1) via a feed hose or tube 60 (FIG. 1). All the other (N-1) inlets are closed (by application of positive air pressure 49 to the inlet valves), although it may be useful in some applications to have two or more inlets supplying the same type of material to the changer at the same time for higher flow rates for example. During the supply mode the dump valve 52 keeps the changer purge outlet 50 closed. The material thus flows in a first direction along the common passage 42 to the pump function 14 due to the suction created at the pump inlet 18.

During a purge mode, which will be described in greater detail hereinafter in terms of an exemplary purge or color change method, compressed purge air flows into the changer 40 via the outlet 58 in a direction that is opposite the flow direction of the material to the pump function. Purging may be performed in various steps and at various pressures, but two of the basic though optional steps are as follows. With the dump valve open to allow flow out the purge outlet 50, all of the inlet valves are closed so that there is a straight through path for purge air to flow from the changer outlet 58 (functioning during purge mode as a purge air inlet) to the purge outlet 50 to clean the common feed passage 42. A second option is to close the dump valve 52 which closes off the purge outlet 50. With the last used inlet valve open and all the other inlet valves closed, purge air flows into the common feed passage 42 from the changer outlet 58 and through the last used inlet to the associated material supply, thus purging the inlet powder flow path from the supply to the common feed passage 42 particularly at the port that joins the inlet passage (to be described hereinafter) to the common feed passage 42. Purging the inlet may be performed prior to closing the inlet valve after a spraying operation so as to reduce the chance of powder being trapped at the inlet valve. After the inlet is purged then the entire common feed passage 42 can be purged out the purge outlet 50.

In an optional purge function described hereinafter with respect to FIG. 1A, a forward purge function may be used in which purge air flows through the changer 40 and out one or more dump valves that may be incorporated into the changer itself. In one embodiment, one or more of the material inlets $\mathbf{44}_N$ are used instead as purge air inlets at one end of the changer, such as the purge outlet end near the purge outlet 50, and one or more material inlets $\mathbf{44}_N$ are used instead as dump valves at an opposite end of the changer, such as for example the outlet end near the changer outlet 58.

In addition to providing back purge to the changer 40, the pump function 14 may provide purge air forward to the application 24. Thus, in the exemplary embodiments herein, the entire powder flow path—from the supply hoppers, through the supply hoses and supply port to the common feed passage 42, through the changer 40, through the feed hose 60, through the pump inlet 18, the pump chamber 32*a* and the pump outlet 20, through the applicator hose 22 and the application 24—can be purged for a complete material application system.

It is noted at this time that depending on how many different colors or material types will be used for a given pump, two or more material changers 40 can be daisy chained together by simply having the changer outlet of a first changer connected by a preferably short hose or tube to the purge port of a second changer.

Figure 2:
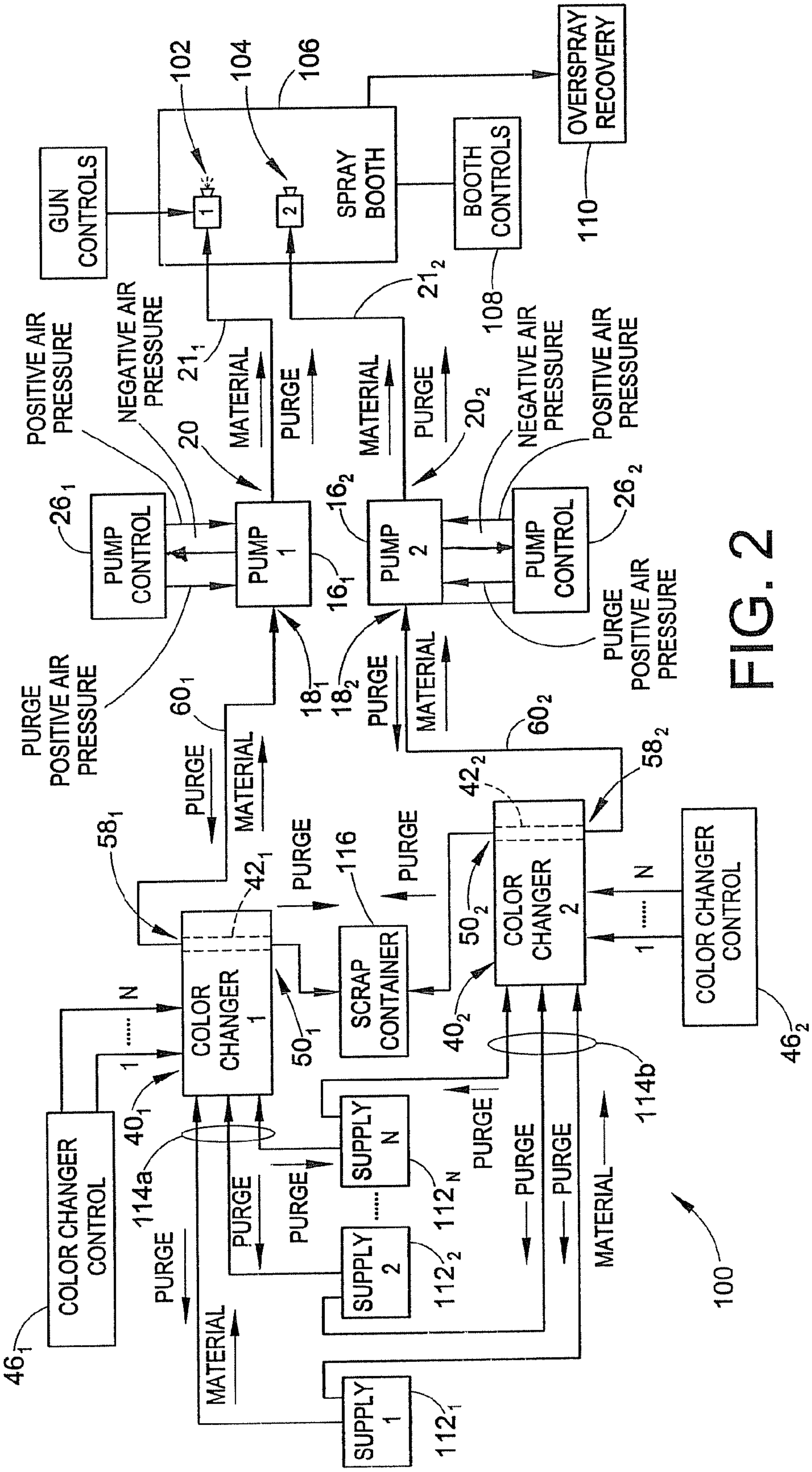
FIG. 2 is a detailed schematic of two gun powder coating material application system using the present invention.

With reference to FIG. 2, we show a more detailed schematic of a complete two gun powder coating material application system 100 using various aspects of the present invention. Common elements with the embodiment of FIG. 1 are given the same reference numerals. The basic operation of the pumps and material changers are the same as in the embodiment of FIG. 1.

The system 100 of FIG. 2 includes two applicators 102, 104 (labeled gun 1 and gun 2 and the associated pumps and changers in the system 100 are also designated with 1 and 2) which may be realized in the form of manual or automatic spray guns, or both, and may be electrostatic or non-electrostatic as required. Although there are only two guns illustrated, the invention may be used with a larger number of guns, and one of the advantages of the present invention is the ability to supply powder and color change operations for a large number of applicators and colors. As a preliminary note, the use of the color changers for two guns allows an operator to spray with one of the guns while the other gun is being purged or changed over to the next color, thus minimizing down time for color change.

The system 100 further includes a spray booth 106 with appropriate booth controls 108 such as may be used for example to control an overhead conveyor (not shown) for transporting parts into and out of the booth 106, as well as controlling a powder overspray recovery system 110. The overspray recovery system 110 may be of any convenient design including a cyclone recovery, filter cartridge recovery and so on. The recovery system 110 may transfer the recovered powder to waste or back to the material supplies 112.

A plurality of N material supplies 112 are used and may represent N colors for example or other material characteristics. The supplies 112 may be for example, simple boxes or feed hoppers to name a few well known examples. Each supply 112 includes a first supply hose 114*a* that goes to a first material changer $\mathbf{40}_1$ and a second supply hose 114*b* that goes to a second material changer $\mathbf{40}_2$. The first color changer $\mathbf{40}_1$ has a changer outlet $\mathbf{58}_1$ that is connected to an inlet $\mathbf{18}_1$ of a first pump $\mathbf{16}_1$ and the second color changer $\mathbf{40}_2$ has a changer outlet $\mathbf{58}_2$ connected to an inlet $\mathbf{18}_2$ of a second pump $\mathbf{16}_2$. Each changer 40 may have its own changer control function 46 as previously described herein, and each pump may include its own pump control function 26 as previously described herein, although any or all of the control functions of the system 100 may be integrated into a single control system. The changers 40 are connected to their respective pumps 16 preferably though not necessarily via short hose lengths 60, even as short as a few inches to minimize suction losses and also to minimize hose volumes needing to be purged. Each changer 40 also has a purge outlet 50 which may share a common dump receptacle 116 for example through associated dump valves (FIG. 1).

In an exemplary operation, the operator selects via the changer control which supply 112 will be used by each gun 102, 104. Each changer 40 connects one inlet at a time to its respective common feed passage so that its associated pump 16 sucks powder from the selected supply 112, into the associated pump inlet 18, out the pump outlet 20 through a gun hose 21 to the associated spray gun 102, 104. Each pump 16 also produces compressed purge air back to its associated changer 40 and to its associated gun 102, 104 to purge as described hereinbefore.

Figure 3:
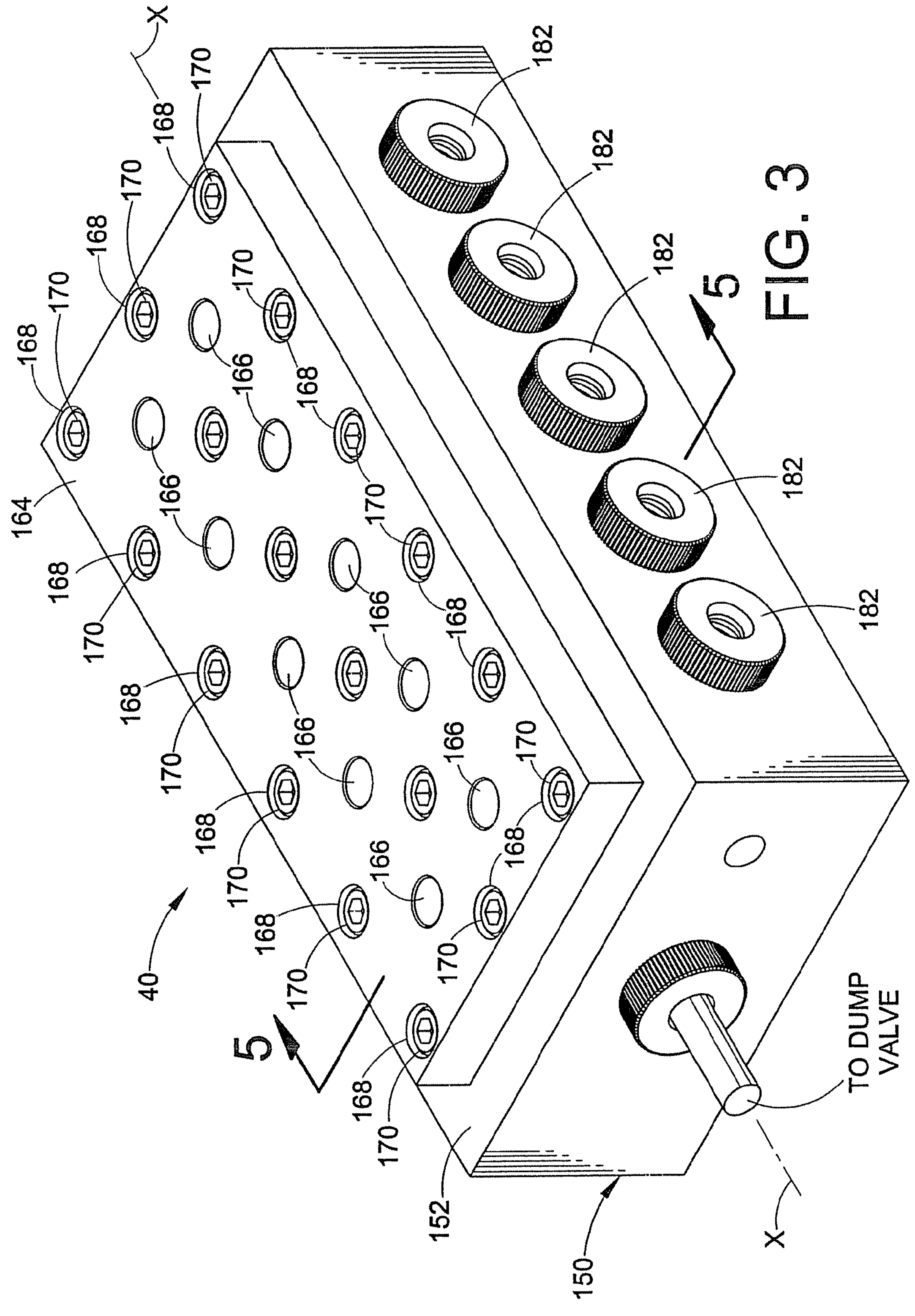
FIG. 3 is a material changer in isometric.
Figure 4:
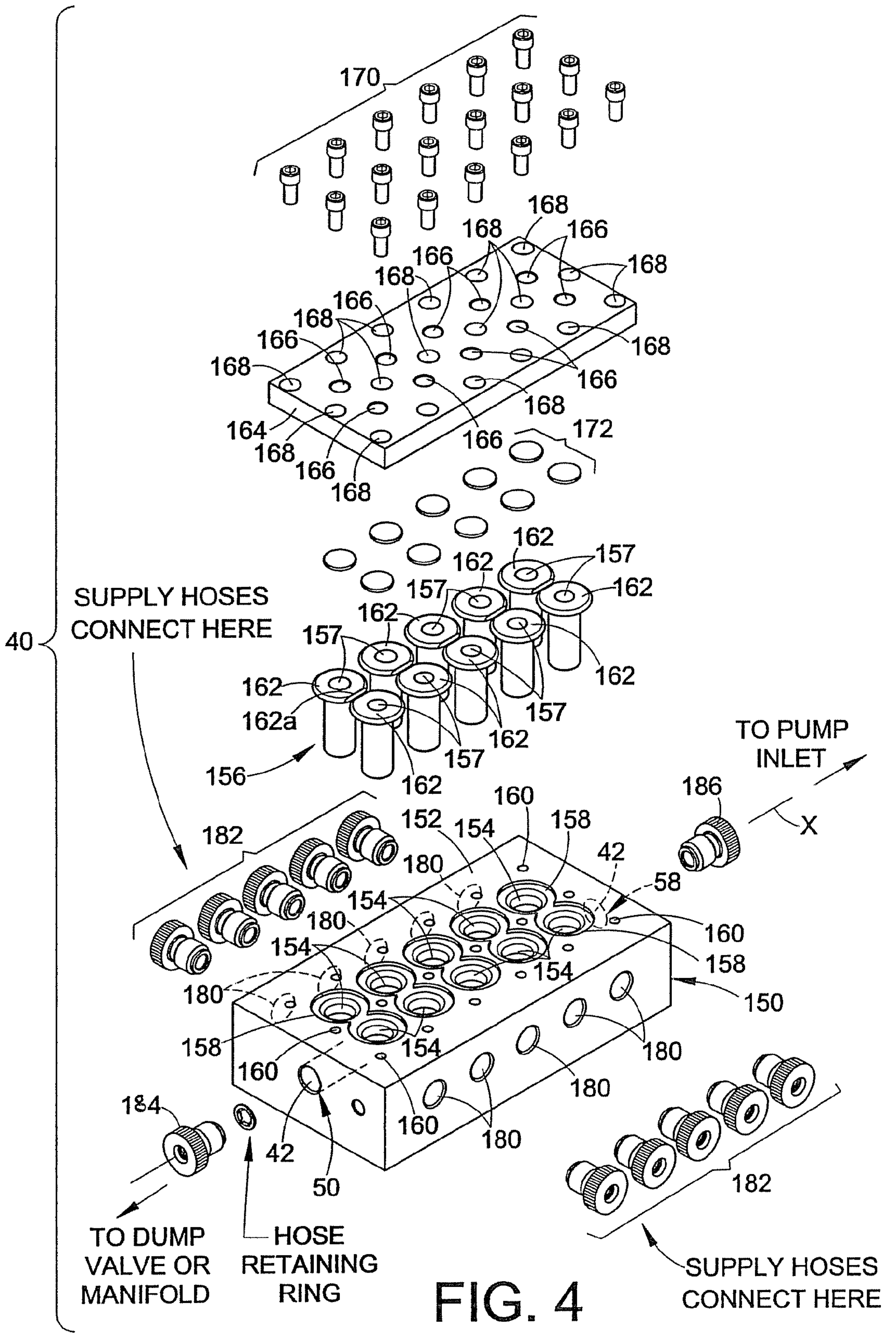
FIG. 4 is the material changer of FIG. 3 in exploded perspective.

With reference to FIGS. 3 and 4, a powder coating material changer 40 is illustrated. The changer 40 includes a main body 150 that may be made, for example, from low impact fusion material, for example UHMW polyethylene or TEFLON™. The main body 150 has a first surface 152 with a plurality of discrete inlet valve chambers 154 formed therein along either side of a longitudinal axis X (provided for reference only) of the changer 40. Each valve chamber 154 receives an elastic cup-shaped valve element or member 156, such as made from natural rubber. The valve elements 156 may extend fully down into its respective valve chamber 154 though such is not required in all cases. Each valve chamber 154 may have a flange receiving recess or counterbore 158. A plurality of bolt holes 160 are also provided in the first surface 152. The valve elements or members 156 function as elastic inflatable bladders that block powder flow when inflated with air pressure and permit powder flow when air pressure is removed by relaxing back to their natural size and shape.

Each valve element 156 may include a lip or flange 162 at one end thereof that will form a pressure tight seal for the associated valve chamber 154. The flanges 162 are appropriately sized somewhat smaller than the recesses 158 so that the flanges 162 can be squeezed and expand to form a tight seal when a compression plate 164 is bolted to the main body 150. Each valve element 156 also has an air pressure passage 157 formed therein. The air pressure passages 157 preferably but not necessarily do not extend all the way through the valve elements 154, however, as an alternative, they may so extend there through in which case a second flange is provided on the opposite end of the valve element (not shown) and a second compression plate (not shown) is used on the opposite side of the main body from the first surface 152 to form a pressure tight seal for the pressure chambers 154.

Each valve element 156 also has an associated porous filter disk 172 that is positioned over the air pressure passage 157. The disk allows pressurized air to enter the pressure passage 157 but prevents powder blow back should a valve element 154 break or leak. The disks 172 are sandwiched between the lower surface of the compression plate 164 and the upper surface of the flange 162 (see FIG. 5.)

The compression plate 164 includes a plurality of air fitting holes 166 and a plurality of bolt holes 168. The plate bolt holes 168 align with the bolt holes 160 in the main body 150.

Bolts 170 are used to attach the compression plate 164 to the main body 150. The air fitting holes 166 each retain an air fitting 174 (FIG. 5) that connects to a source of pressurized air 49 such as at the changer control 46 (FIG. 1.)

The air fitting holes 166 coaxially align with the valve chambers 154, the disks 172 and the pressure passages 157 so that pressurized air enters the pressure passages 157 to close an inlet valve and the inlet valves are open when no pressure is applied.

A plurality of powder inlet passages 180 are formed in the main body 150 on opposite side faces of the main body. Each powder inlet passage 180 retains a respective hose fitting 182 that is used to connect a supply hose 114 (FIG. 2) from a material supply to the powder inlet passage 180. Each powder inlet passage 180 extends through to the central common passage 42 that is formed along the axis X. The powder inlet passages 180 are thus formed transversely to the valve chambers 154 and intersect the valve chambers (see FIG. 5.) In this manner, the valve elements 156 are used to open and close powder flow from the inlet passages 180 to the common flow passage 42. Note that the common flow passage 42 has the changer outlet 58 and the purge outlet 50. Each outlet may have a hose fitting 184, 186 to retain the pump feed hose 60 (FIG. 1) and a purge hose. Note that the dump valve 52 (FIG. 1) may be separately provided from the changer 40 (as shown in FIG. 4) or integrated into the main body 150.

Figure 5:
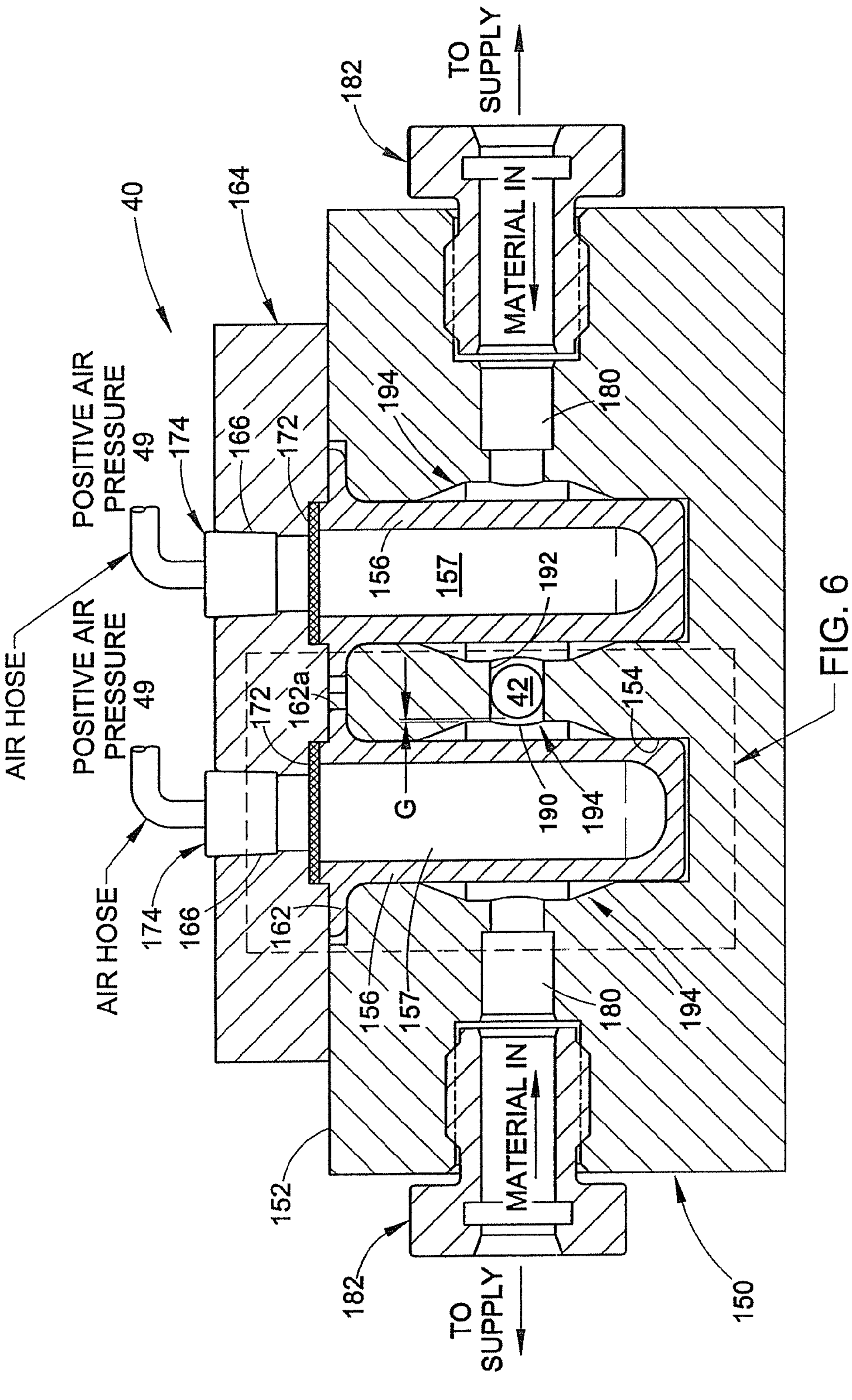
FIG. 5 is a cross-section of the changer of FIG. 3 taken along the line 5-5 in FIG. 3 showing inlet valves in an open position.
Figure 6:
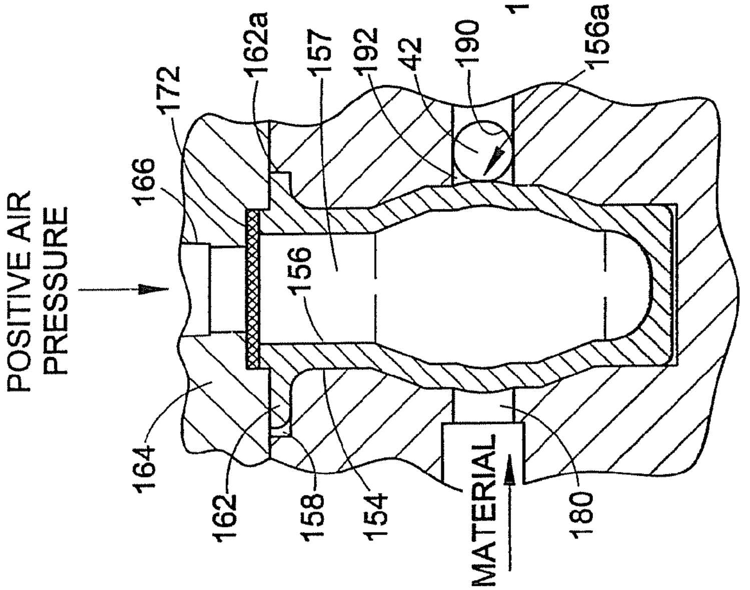
FIG. 6 is an enlarged view of the circled region in FIG. 5 but showing an inlet valve in a closed position.

With reference to FIGS. 5 and 6, each inlet passage 180 extends through to the valve chamber 154 then to a supply port 190 that is formed in the wall 192 that defines the common feed passage 42. In the central region 194 of the valve chamber 154, the valve chamber 154 is widened beyond the diameter of the valve member 156. This widening may be a tapering as illustrated in FIG. 5. This enlarged volume provides room for a central portion of the bladder or valve member 156 to expand or bulge when compressed air is fed into the pressure passage 157. This controlled bulge produces a small bump or protrusion 156*a* that expands into the supply port 190 and closes the port. The amount of protrusion or size of the bump is minimized to prevent a dead spot in the common feed passage 42, however, a small portion is allowed to extend into the passage 42 to prevent any recesses or entrapment areas in the inlet passage. In this manner the valve member 156, and in particular the protrusion 156*a*, provides a near bore line seal with the wall 192 at the supply port 190. The gap G between the supply port 190 and the wall 192 may be kept to a minimum so that the valve member 156 will expand partially into the common feed passage 42 without excessive stress on the valve member. Machining tolerances may be such that the gap G in practice is not actually present. By allowing for some gap G, a uniform seat is provided for the valve element 156 to seal against, however, in some cases there may be no need to include the gap G.

When air pressure is removed from the air passage 157, the elastic valve member 156 relaxes to its natural form illustrated in FIG. 5. This opens the supply port 190 so that powder may flow from the inlet passage 180 around the valve member 156 and into the common feed passage 42 under suction produced by the pump.

From FIGS. 4 and 5 it will be noted that each flange 162 of the valve members 156 include a flat 162*a*. This flat allows closer spacing of the valve members near the common feed passage 42 to minimize any dead space while still permitting a substantial flange 162 to seal the valve chamber 154.

Figure 1A:
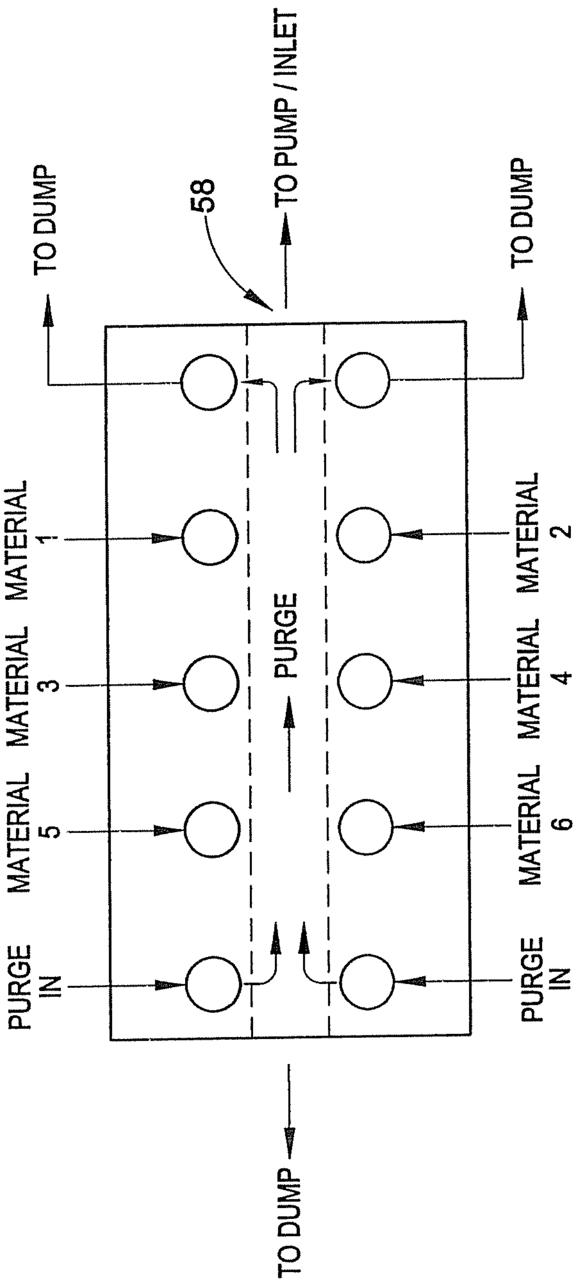
FIG. 1A is a plan or top view of an alternative configuration for a color changer in accordance with the invention.

With reference to FIG. 1A, in an alternative or additional configuration, the changer 40 may be arranged so that one or more of the inlets 44 (FIG. 1) is used as a purge inlet and one or more of the inlets 44 (FIG. 1) is used as a dump valve so that the changer 40 may also be purged in the same direction as the direction of material flow through the common feed passage. In the example of FIG. 1A, two purge inlets are provided at one end of the changer, preferably but not necessarily at the purge outlet 50 end, and two purge or dump outlets are provided at the opposite end of the chamber, such as the outlet 58 end. In this manner, positive pressure air may be applied at the purge inlets which flows through the changer common feed passage towards the outlet 58 end and out the dump outlets. The forward purge may be used as part of the initial purge sequences to remove as much of the powder from the changer and powder flow path after a spraying operation is completed. This forward purge function for the changer may improve overall powder removal over and above just using the reverse purge feature. The purge inlets and the dump outlets that are incorporated into the changer 40 may use the same inflatable bladder like valve elements 156 to open and close the associated flow passages.

Figure 7:
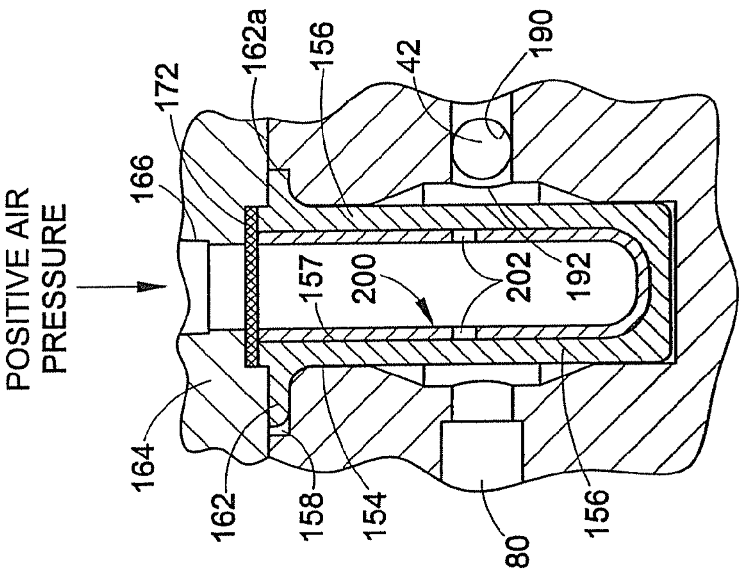
FIG. 7 is a second embodiment of an inlet valve for the changer of FIG. 3.

With reference to FIG. 7, in an alternative embodiment, a rigid support member 200 may be inserted into the valve member air passage 157. This optional feature is particularly but not exclusively useful for the purge valve inlets and the dump valve outlets of FIG. 1A because when the valves are open to allow pressurized purge air to flow into the common feed passage 42, the purge air flow must go around the elastic bladder valve element 156. If the flow velocity is high enough the valve element 156 might collapse. The support member 200 is used to support the valve member 156 against external pressure such as will arise during purging. In this embodiment, the support member 200 is cup-shaped generally to conform to the profile of the air passage 157 in the valve member 156. Alternatively for example the support member 200 may simply be a piece of air tubing inserted into the air passage 157 and having a plurality of holes to pass air. The support member may be made of porous material such as the same material as the disks 172 (for example sintered polyethylene), or may be perforated with a number of holes 202 so that pressurized air passes through the support member 200 to expand the valve member to close its associated supply port 190, but will prevent the valve member 156 from collapsing when purge air is applied to the purge inlet.

Figure 8:
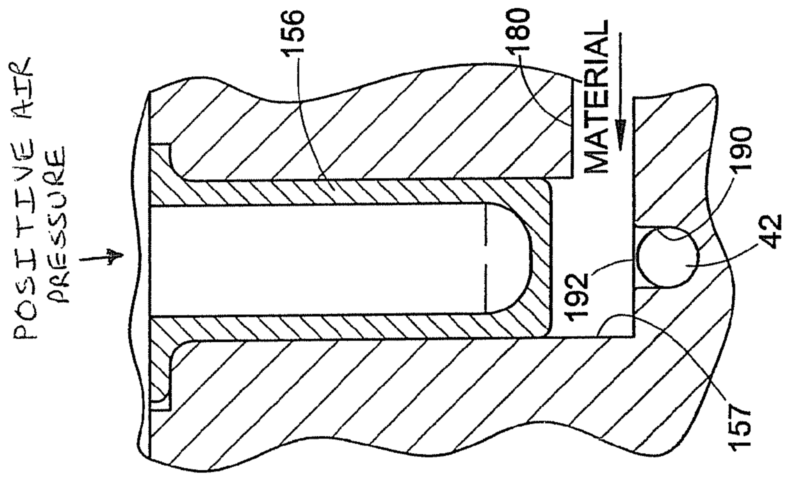
FIG. 8 is a third embodiment of an inlet valve for the changer of FIG. 3.

FIG. 8 illustrates another alternative embodiment. In this case, the common feed passage 42 is formed below the valve chamber 154. The lower valve chamber wall includes the supply port 190 formed in the wall 192 that defines the common feed passage 42. Again a small gap may be provided as described hereinabove. In this embodiment, when compressed air is introduced into the air passage 157 of the valve member 156, the valve member expands lengthwise with again a slight bulge protruding into the common feed passage 42 to seal the supply port 190. Note that the powder inlet passage 180 is also formed lower and opens to the valve chamber 154 below the bottom end of the valve member 156 when the valve member is in its unexpanded condition. This arrangement provides an unobstructed flow path for powder from the inlet passage 180 to the common feed passage 42 without powder having to flow around the valve member 156.

In accordance with another aspect of the invention, the combination of a color changer function in accordance with the invention and a reverse purge function facilitates a color change procedure that can be performed for an entire powder flow path of the entire material application system, from the supply to the outlet nozzle of the applicator such as a spray gun. From a system level point of view (FIG. 2 for example) the powder flow path includes the supply hoses 114, the color changer 40, the feed hose 60, the pump inlet, pump chamber

32*a* and pump outlet, the gun hose 21 and the spray gun 102 flow path (from inlet to the gun through the nozzle outlet or spray orifice.)

Presume that the system 100 has been being used to spray a first material or color through gun 1 (102). In order to change over to a second material or gun, the following exemplary material change process may be used, although the precise order of the steps, or more or fewer steps, may be adopted in particular applications as required. After the spray gun has been turned off or otherwise disabled, all of the inlet valves except the last used one of the color changer $\mathbf{40}_1$ are closed (by applying positive air pressure to their respective air passages.) The dump valve or valves 52 (FIG. 1) are opened (as well as the optional dump valves of FIG. 1A when that embodiment is used) and the pump 16 may be operated at full flow setting meaning that the pump is drawing in maximum air flow through the color changer to remove most of the powder in the powder flow path from the prior spraying operation. The air flow through the changer and pump acts as a siphon purge and also is pushed through the spray gun thereby performing an initial purge of the powder flow path. Although the last used inlet valve may be left open during this siphon purge, new powder does not enter the changer from the supply.

After the siphon purge is completed (for example about one second in duration) a soft purge may be performed with the dump valves 52 open (gun still disabled, all changer inlet valves still closed except the last used inlet valve is still open.) Positive air pressure 28, for example about 2.5 SCFM, normally used to pump powder out of the pump chamber 32*a* bleeds through the porous tubes 32*b* and flows to both the gun 102 and the changer 40 and out the purge outlet 50 as well as the still open last used inlet. Alternatively the gun may be separately purged, for example at about 4 SCFM.

The soft purge back to the supply through the last used supply inlet helps remove any powder from the inlet valve and especially at the supply port 190 before the valve is closed. This soft purge may be about three seconds. The dump valves 52 may then be closed and the soft purge performed through the gun only for about one second. This could also be done by closing off the pump inlet powder flow control valves (not shown.)

After the soft purge is completed, a hard purge may be performed by using the purge air 34 that passes directly into and through the pump chamber 32*a* and out the pump inlet 18 to the color changer 40 and out the color changer purge outlet 50 (gun still disabled, all changer inlet valves closed.) This purge may be performed for example at system pressure, for example about 85 psi. This initial hard purge may be performed to the changer only with the gun 102 isolated by closing the pump outlet control valve (not shown.) This initial hard purge may last about four to five seconds for example. The hard purge, and all the purges for that matter, may optionally be performed by pulsing the air, continuous flow or a combination of pulsing and continuous. During the hard purge the purge air that bleeds through the porous tube may still be applied.

After the initial hard purge through the chamber, a hard purge through the gun 102 may be performed (gun still disabled.) This hard gun purge may be performed with the changer 40 isolated by closing the pump inlet 18 powder flow control valves.

After the system has been purged, the next selected inlet valve for the next color or material to be used is opened and the pump is set at maximum flow again to begin pumping the new powder as soon as possible out the gun, after which a normal spraying operation can be performed with the gun enabled.

A significant aspect of the invention is the ability to optionally purge in both directions through the color changer, and also to optionally purge back through the inlet valves to the supply. The entire powder flow path from supply through the gun nozzle can also be purged, including soft and hard purge operations. The initial soft purge through the gun and color changer is useful in some applications so that if there is a lot of powder in the flow path this powder can be gently removed before hitting the system with a hard purge. Using hard purge from the outset may cause impact fusion, particularly in the gun nozzle for example.

The purge operation, and for that matter all the control functions with respect to operation of the changer, the pumps, the guns, the booth and the recovery system, may be implemented with programmable or other suitable electronic or pneumatic control systems as are well known to those skilled in the art for controlling the actuation and timing of various air valves and flow control valves and so on, thus allowing for a fully automated purge and color change operation.

The invention has been described with reference to the exemplary embodiments. Modifications and alterations will occur to others upon a reading and understanding of this specification and drawings. The invention is intended to include all such modifications and alterations insofar as they come within the scope of the appended claims or the equivalents thereof.

We claim:

1. A powder coating material system, comprising:

a powder spray gun;

a first supply of powder coating material and a second supply of powder coating material;

a powder coating material changer comprising a first inlet that is connectable to said first supply, and a second inlet that is connectable to said second supply, said powder coating material changer having a common feed passage selectively in flow communication with each of said first inlet and said second inlet, said common feed passage having a material changer outlet and a purge outlet, a first supply valve associated with said first inlet and a second supply valve associated with said second inlet, said first supply valve selectively being operable to prevent flow from said first supply to said common feed passage, said second supply valve selectively being operable to prevent flow from said second supply to said common feed passage, and wherein said purge outlet has an associated valve to open and close flow through said purge outlet, said common feed passage has said material changer outlet at a first end and said purge outlet at a second end, a pump to transport powder coating material from a selected one of said first supply and said second supply to said powder spray gun, said pump having a pump inlet and a pump outlet, a pump feed hose that is connectable between said pump inlet and said material changer outlet, a powder spray gun hose that is connectable between said pump outlet and said powder spray gun, wherein during a supply mode, said pump is operable to apply negative air pressure to pull powder coating material out of a selected supply through said common feed passage of said material changer and through said pump feed hose and said pump inlet into said pump, and is operable to apply positive air pressure to push powder coating material from said pump outlet through said powder spray gun hose to said powder spray gun, and wherein during a purge mode, said pump is operable to apply positive air pressure to said pump outlet to push powder coating material through said powder spray gun hose to said powder spray gun, and to apply positive air pressure to said pump inlet to push powder coating material through said pump feed hose, said common feed passage and said purge outlet when said purge outlet associated valve is open, and said pump is operable to apply positive air pressure to said material changer outlet to flow through said common feed passage and out a selected said material changer inlet to a selected supply when said purge outlet associated valve is closed and a selected supply valve is open.

2. The system of claim 1 wherein each said supply valve is pneumatically actuated.

3. The system of claim 2 wherein air pressure is provided to each said supply valve to prevent flow of powder coating material into said common feed passage from its associated inlet .

4. The system of claim 3 wherein each said supply valve comprises an elastic valve member that expands in response to air pressure.

5. The system of claim 1 comprising a purge outlet hose having one end connected to said purge outlet and a second end connectable to a material collector.

6. The system of claim 5 wherein said material collector is a spray booth.

7. The system of claim 1 wherein said pump applies negative air pressure to pull powder coating material from a selected supply through said common feed passage in a first direction and applies positive air pressure to purge powder coating material through said common feed passage in a second direction that is opposite said first direction.

8. The system of claim 7 wherein said positive air pressure pushes powder coating material selectively through either said purge outlet associated with said common feed passage or a selected inlet.

9. The system of claim 1 wherein each of said first inlet and said second inlet is connected to said common feed passage through a respective port formed in a wall of said common feed passage.

10. The system of claim 9 wherein each said respective port when blocked provides minimum dead space between its associated inlet and said common feed passage.

11. The system of claim 10 wherein each said supply valve comprises a valve member that forms a near bore line seal at said port.

12. The system of claim 9 wherein each said supply valve is selectively operable to prevent flow from its associated supply of powder coating material into said common feed passage by blocking its respective port.

13. The system of claim 1 wherein during purge mode positive air pressure is applied to said pump outlet and said pump inlet at the same time.

* * * * *